Patented Nov. 16, 1948

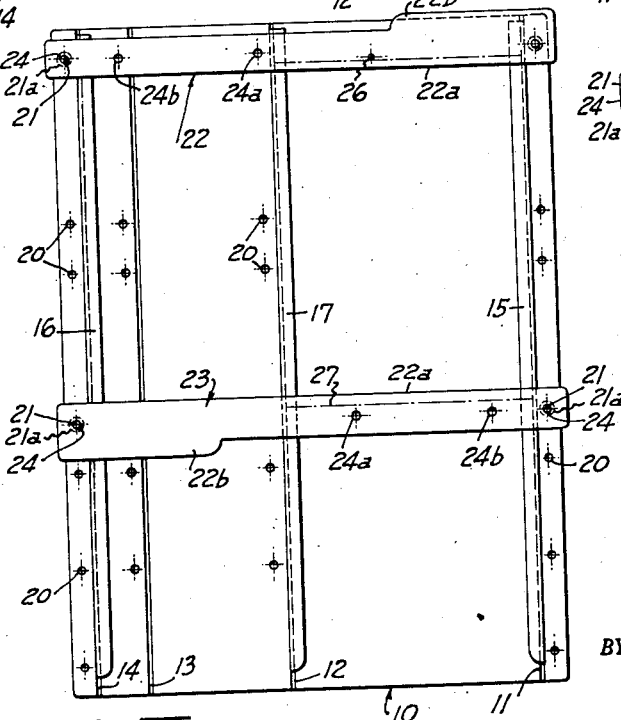

2,454,097

UNITED STATES PATENT OFFICE 2,454,097

PHOTOGRAPHIC PRINTING EASEL

Floyd V. Schleimer, San Francisco, Calif.

Application March 2, 1946, Serial No. 651,444

3 Claims. (Cl. 88—24)

This invention relates to photographic equipment and particularly to a device for holding enlarging paper in an enlarging apparatus.

Particularly this invention relates to an easel adapted to be used in connection with conventional enlarging equipment and in which a number of the standard sizes of enlarging paper may be held.

The conventional devices used for this purpose are unduly complicated and furthermore do not provide the flexibility required. In addition the construction is such that it is troublesome to adjust the same to enlarging sheets of various sizes, including standard sizes such as 8 by 10 inches, 5 by 7 inches, etc.

It is an object of the present invention to provide a relatively simple photographic enlarging easel which can be quickly adjusted for photographic enlarging paper of various conventional sizes.

It is a further object of the present invention to provide a photographic enlarging easel which provides margins of predetermined width and design upon the enlarged picture.

It is a further object of this invention to provide a photographic easel having standard masking media by which a portion of the picture may or may not be masked according to the wishes of the user.

Further objects and advantages of this device will appear from the following specification when taken in conjunction with the accompanying drawing, in which:

Figure 1 is a plan view of a photographic easel incorporating my invention;

Figure 2 is a facsimile of an enlargement made upon the easel shown in Figure 1;

Figure 3 is an end elevational view of the easel shown in Figure 1;

Figure 4 is a fragmentary view of one corner of the easel shown in Figure 1 showing how a tab may be affixed to one of the masking devices;

Figure 5 is a plan view of my photographic easel adapted to be used with a small size of enlarging paper; and Figure 6 is a facsimile of a picture showing the margins obtained by the device illustrated in Figure 5.

As shown in Figures 1, 3 and 5 I have provided a base 10 in the form of a flat plate or board. This plate is provided with a plurality of longitudinal parallel grooves 11, 12, 13 and 14 which are spaced apart generally as shown, and preferably so as to accommodate the standard sizes of enlarging paper. For example, grooves 12, 13 and 14 may be spaced apart slightly more than 5, 7 and 8 inches respectively from groove 11.

Grove 11 is adapted to accommodate a flanged guide and margin forming member 15 as shown in the drawing. This member 15 is preferably in the form of a strip made of moldable plastic or like material and is firmly held in groove 11. A like flanged member 16 is held in the slot 14. A third flanged member 17 is adapted to be placed in either of grooves 12 or 13 (or to be removed in entirety) as will hereinafter be more fully explained. As shown in Figure 3 flanged members 15 and 16, and also member 17, are adapted to overlie a portion of the base 10 and, consequently, the side edges of a sheet of enlarging paper when the same is placed upon base 10.

I have also provided a plurality of holes 20 adjacent each side edge of base 10, as shown. These holes are adapted to accommodate upstanding locating members or pins 21. Pins 21 are of suitable length and are provided with flanges 21a whereby they may be urged into holes 20 with a portion thereof extending above the base 10 and the upper faces of members 15, 16 and 17.

I also provide a pair of strip-like masking members 22 and 23. These members may or may not be identical, but as shown herein consist of duplicate members each of which has one straight edge 22a. The other side edge is provided with a tab 22b the use of which will be hereinafter more fully explained. Each of the members 22 and 23 is provided with openings 24 near its ends and which are adapted to accommodate the pins 21 as shown in Figures 1, 3 and 5.

A pin 26 or other suitable stop is mounted in base 10 and provides an abutment against which the upper end of a sheet of enlarging paper may be placed to determine its proper longitudinal position on the base 10.

Use of the device may be more fully explained as follows: A sheet of enlarging paper 27, as shown by the dotted line in Figure 1, is placed upon the base 10 with its side edges underlying flanged members 15 and 16 as shown. The paper is preferably slid into position by placing its side edges under the horizontal flanged portions of members 15 and 16 at one end of the base board, after which it is slid over the board with its side edges being guided by members 15 and 16, until it strikes abutment 26. Masking member 22 is placed upon pins 21 at the upper edge of base 10 as shown in either Figures 1 or 5. The other end masking member 23 is placed upon corresponding pins 21 generally as shown in either Figures 1 or 5. A portion of members 22 and 23 will overlie the end edges of the enlarging paper as shown by the dotted line in Figure 1. Tabs 22b in Figure 1 are so placed that they will mask an additional portion of the enlarging paper whereupon the ultimate picture which is produced will be that shown in Figure 2, in which members 22b have formed blocked out portions 28 of that picture. End masking means 22 and 23 have formed end margins 29 and 30 respectively and the overhanging flanges on members 15 and 16 have formed side margins 31 and 32 respectively. The portions 28 may be utilized to provide a space within which various notations may be placed. They may also be utilized to vary the margins of the picture to suit the wishes of the operator.

As shown in Figure 1, the device utilizes the largest piece of enlarging paper and presents the largest picture obtainable. Member 17 in this instance is not used. However, as shown in Figure 5, a smaller enlargement (i. e. 5 by 7 inches) may be made. The removable strip 17 has been placed in groove 12 and a piece of enlarging paper of suitable width has been slid under the members 15 and 17 and abuts the pin 26. The end masking member 22 has been placed in a position with its straight edge covering the upper end of the enlarging paper. Pins 21a have been placed in selected holes 20 and end member 23 placed thereon with its straight edge uppermost and overlying the lower end of the enlarging paper. With the device so used a picture generally as shown in Figure 6 will be obtained with the end margins 33 and 34 having been made by use of members 22 and 23 respectively and the side margins 35 and 36 having been made by the overhanging portions of members 17 and 15 respectively.

It will be appreciated that any desired margin design may be obtained by using a particular masking member 22 or 23, having an edge incorporating the desired design or contour.

As shown in Figure 5, other series of holes 20 may be provided adjacent grooves 12 and 13 to cooperate with holes 24a and 24b and in members 22 and 23. In this manner greater adjustability is obtained and when smaller paper is used and member 17 utilized in either groove 12 or 13, masking members 22 and 23 may be used in any desired arrangement to obtain the desired margins.

As shown in Figure 4, other techniques may be utilized with my device. For example, a very thin and clear piece of Celluloid 38 may be affixed to member 22 and extend over the edge thereof onto the enlarging paper. Any opaque matter appearing on Celluloid 38 will be transferred to the enlarged picture as shown in the upper left hand corner of Figure 2.

I claim:

1. In a photographic enlargement easel, a base, a fixed flanged guide adjacent one side edge of said base, a second strip-like flanged guide adapted to be positioned in any one of a plurality of predetermined positions parallel to said first named flanged guide, the flanges on said guides forming masking media adapted to overlie the side edges of enlarging paper placed on said base, a pair of reversible opaque masking members extending the width of said base, a plurality of pins adjacent the side edges of said base, openings in said masking members adapted to receive selected pins so that said opaque masking members may be placed parallel to each other over said base at a desired distance apart, at least one of said end masking media having one straight edge and one irregular edge whereby either a straight or irregular edge may be caused to overlie the adjacent edge of said enlarging paper.

2. In a photographic enlargement easel, a fixed flanged guide, a second flanged guide adapted to be positioned in any one of a plurality of predetermined positions parallel to said first named flanged guide, the flanges on said guides forming masking media adapted to overlie opposite edges of enlarging paper placed between said guides, a pair of reversible opaque strip-like masking members, a plurality of pins adjacent said guides, openings in said masking members adapted to cooperate with selected pins so that said opaque masking members may be placed parallel to each other over said base, at least one of said end masking members having one straight edge and one irregular edge whereby either a straight or irregular edge may be made to overlie one edge of said enlarging paper.

3. In a photographic enlargement easel, a base, a plurality of parallel grooves in said base, a fixed flanged guide in one of said grooves adjacent one side edge of said base, a second flanged guide adapted to be positioned in any one of said parallel grooves and parallel to said first named flange guide, the flanges on said guides forming masking media adapted to overlie the said edges of enlarging paper placed on said base, a plurality of pins adjacent the side edges of said base and outside the area between said flanged guides, a pair of reversible masking media extending the width of said base and having openings therein adapted to engage certain of said pins so that said reversible masking members may be placed parallel to each other and over said base and said flanged guides at a desired distance apart, at least one of said end masking media having one straight edge and one irregular edge whereby either a straight or irregular edge may be caused to overlie the adjacent edge of said enlarging paper at either side thereof.

FLOYD V. SCHLEIMER.

REFERENCES CITED

The following references are of record in the file of this patent:

UNITED STATES PATENTS

| Number | Name | Date |
|---|---|---|
| 864,254 | Perkins | Aug. 27, 1907 |
| 2,213,313 | Hill | Sept. 3, 1940 |
| 2,223,264 | Moore | Nov. 26, 1940 |